United States Patent
Yu et al.

(10) Patent No.: US 7,518,819 B1
(45) Date of Patent: Apr. 14, 2009

(54) DISK DRIVE REWRITING SERVO SECTORS BY WRITING AND SERVOING OFF OF TEMPORARY SERVO DATA WRITTEN IN DATA SECTORS

(75) Inventors: Jie Yu, Irvine, CA (US); Guoxiao Guo, Foothill Ranch, CA (US); Jack M. Chue, Los Altos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 60 days.

(21) Appl. No.: 11/849,029

(22) Filed: Aug. 31, 2007

(51) Int. Cl.
*G11B 21/02* (2006.01)
*G11B 27/36* (2006.01)

(52) U.S. Cl. .................. 360/75; 360/31; 360/77.08; 360/78.14

(58) Field of Classification Search .............. None
See application file for complete search history.

(56) References Cited

U.S. PATENT DOCUMENTS

| | | |
|---|---|---|
| 4,949,036 A | 8/1990 | Bezinque et al. |
| 5,487,077 A | 1/1996 | Hassner et al. |
| 5,600,500 A | 2/1997 | Madsen et al. |
| 5,682,273 A | 10/1997 | Hetzler |
| 5,835,295 A | 11/1998 | Behrens |
| 5,872,800 A | 2/1999 | Glover et al. |
| 5,909,334 A | 6/1999 | Barr et al. |
| 5,923,485 A | 7/1999 | Ito |
| 5,930,358 A | 7/1999 | Rao |
| 5,941,998 A | 8/1999 | Tillson |
| 6,049,437 A | 4/2000 | Wevers |
| 6,052,804 A | 4/2000 | Thowe et al. |
| 6,181,500 B1 | 1/2001 | Serrano et al. |
| 6,266,199 B1 | 7/2001 | Gillis et al. |
| 6,289,484 B1 | 9/2001 | Rothberg et al. |
| 6,307,696 B1 | 10/2001 | Bishop et al. |
| 6,317,850 B1 | 11/2001 | Rothberg |
| 6,327,106 B1 | 12/2001 | Rothberg |
| 6,359,744 B1 | 3/2002 | Mallary |
| 6,384,999 B1 | 5/2002 | Schibilla |
| 6,393,511 B1 | 5/2002 | Albrecht et al. |
| 6,429,984 B1 | 8/2002 | Alex |
| 6,490,111 B1 | 12/2002 | Sacks |
| 6,600,620 B1 | 7/2003 | Krounbi et al. |
| 6,603,617 B1 | 8/2003 | Cross |
| 6,606,211 B1 | 8/2003 | Lim et al. |
| 6,628,466 B2 | 9/2003 | Alex |
| 6,650,492 B2 | 11/2003 | Lenny et al. |

(Continued)

*Primary Examiner*—Jason C Olson
(74) *Attorney, Agent, or Firm*—Howard H. Sheerin, Esq.

(57) ABSTRACT

A disk drive is disclosed comprising a disk having a plurality of tracks, wherein each track comprises a plurality of data sectors and a plurality of servo sectors. The disk drive further comprises a head actuated over the disk, the head comprising a read element radially offset from a write element by a reader/writer offset. In order to rewrite a marginal servo sector detected in a target track, control circuitry within the disk drive relocates user data recorded in a first data sector of a near adjacent track to a staging memory. Servo data is written over the first data sector, and the read element is used to read the servo data written over the first data sector to actuate the head to rewrite the marginal servo sector of the target track. The user data stored in the staging memory is then rewritten to the first data sector.

37 Claims, 8 Drawing Sheets

U.S. PATENT DOCUMENTS

| | | | |
|---|---|---|---|
| 6,654,193 B1 * | 11/2003 | Thelin | 360/53 |
| 6,661,597 B1 | 12/2003 | Codilian et al. | |
| 6,691,255 B1 | 2/2004 | Rothberg et al. | |
| 6,697,203 B1 | 2/2004 | Cheng et al. | |
| 6,714,368 B1 | 3/2004 | Himle et al. | |
| 6,747,827 B1 | 6/2004 | Bassett et al. | |
| 6,781,780 B1 | 8/2004 | Codilian | |
| 6,791,775 B2 | 9/2004 | Li et al. | |
| 6,798,591 B2 | 9/2004 | Barnett et al. | |
| 6,809,893 B2 | 10/2004 | Uzumaki et al. | |
| 6,826,007 B1 | 11/2004 | Patton, III | |
| 6,854,022 B1 | 2/2005 | Thelin | |
| 6,854,071 B2 | 2/2005 | King et al. | |
| 6,862,505 B2 | 3/2005 | Satoh et al. | |
| 6,892,249 B1 | 5/2005 | Codilian et al. | |
| 6,895,500 B1 | 5/2005 | Rothberg | |
| 6,898,033 B2 | 5/2005 | Weinstein et al. | |
| 6,947,234 B2 | 9/2005 | Lamberts et al. | |
| 6,948,102 B2 | 9/2005 | Smith | |
| 6,950,967 B1 | 9/2005 | Brunnett et al. | |
| 6,982,842 B2 | 1/2006 | Jing et al. | |
| 6,987,630 B1 | 1/2006 | Higgins et al. | |
| 6,995,933 B1 | 2/2006 | Codilian et al. | |
| 7,006,321 B2 | 2/2006 | Kisaka | |
| 7,024,614 B1 | 4/2006 | Thelin et al. | |
| 7,032,127 B1 | 4/2006 | Egan et al. | |
| 7,050,252 B1 | 5/2006 | Vallis | |
| 7,076,604 B1 | 7/2006 | Thelin | |
| 7,082,494 B1 | 7/2006 | Thelin et al. | |
| 7,120,737 B1 | 10/2006 | Thelin | |
| 7,143,203 B1 | 11/2006 | Altmejd | |
| 7,173,782 B2 | 2/2007 | Ikeda et al. | |
| 2003/0007269 A1 | 1/2003 | Alex | |
| 2003/0016461 A1 | 1/2003 | Seng et al. | |
| 2003/0197968 A1 | 10/2003 | Sacks et al. | |
| 2004/0061967 A1 | 4/2004 | Lee et al. | |
| 2004/0153949 A1 | 8/2004 | Ro et al. | |
| 2004/0174627 A1 | 9/2004 | Kim et al. | |
| 2004/0268033 A1 | 12/2004 | Chia et al. | |
| 2005/0036437 A1 | 2/2005 | Learned et al. | |
| 2005/0078393 A1 | 4/2005 | Cho | |
| 2005/0146803 A1 | 7/2005 | Kim et al. | |
| 2005/0188153 A1 | 8/2005 | Yun et al. | |
| 2005/0207049 A1 | 9/2005 | Ikeda et al. | |
| 2005/0264917 A1 | 12/2005 | Yano et al. | |
| 2006/0066971 A1 | 3/2006 | Alex et al. | |
| 2006/0098318 A1 | 5/2006 | Feng | |
| 2006/0101197 A1 | 5/2006 | Georgis et al. | |
| 2006/0132954 A1 | 6/2006 | Wada et al. | |
| 2006/0198041 A1 | 9/2006 | Kuwamura | |
| 2007/0076315 A1 | 4/2007 | McMurtrey | |
| 2007/0277011 A1 | 11/2007 | Tanaka et al. | |

* cited by examiner

US 7,518,819 B1

DISK DRIVE REWRITING SERVO SECTORS BY WRITING AND SERVOING OFF OF TEMPORARY SERVO DATA WRITTEN IN DATA SECTORS

BACKGROUND

1. Field

The present invention relates to disk drives for computer systems. In particular, the present invention relates to a disk drive that rewrites servo sectors by writing and servoing off of temporary servo data written in data sectors.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The servo sectors $6_0$-$6_N$ may be written to the disk using any suitable technique, such as an external servo writer which writes the servo sectors on the disk after the disk is inserted into the head disk assembly (HDA), or using a media writer or stamping technique which writes (or stamps) the servo sectors on the disk prior to being inserted into the HDA. Alternatively, the disk drive may self-servo write the servo sectors using circuitry internal to the disk drive. Regardless of the technique, the method of writing the servo sectors is not perfect and may result in marginal servo sectors, and even if the servo sectors are of sufficient quality when written initially, they may degrade over the lifetime of the disk drive and may eventually become marginal or altogether unreadable. In addition, the servo sectors may be corrupted or erased due to an operating error of the disk drive.

There is, therefore, a need for a disk drive that compensates for marginal servo sectors.

SUMMARY OF THE EMBODIMENTS OF THE INVENTION

An embodiment of the present invention comprises a disk drive comprising a disk having a plurality of tracks, wherein each track comprises a plurality of data sectors and a plurality of servo sectors. The disk drive further comprises a head actuated over the disk, the head comprising a read element radially offset from a write element by a reader/writer offset. In order to rewrite a marginal servo sector detected in a target track, control circuitry within the disk drive relocates user data recorded in a first data sector of a near adjacent track to a staging memory. Servo data is written over the first data sector, and the read element is used to read the servo data written over the first data sector to actuate the head to rewrite the marginal servo sector of the target track. The user data stored in the staging memory is then rewritten to the first data sector.

In one embodiment, the staging memory comprises a spare data sector on the disk. In another embodiment, the staging memory comprises a semiconductor memory.

In another embodiment, the near adjacent track is radially offset from the target track by at least one track, wherein the radial offset is based on the reader/writer offset.

In yet another embodiment, the disk comprises a plurality of physical zones, wherein each physical zone comprises a plurality of tracks each having data sectors recorded at a user data rate and servo sectors recorded at a servo data rate. The control circuitry comprises write circuitry configured to write the servo data over the first data sector at the servo data rate. In one embodiment, the control circuitry comprises read circuitry configured to read the servo data written over the first data sector at the servo data rate.

In still another embodiment, servo data in the servo sectors of the near adjacent track are read and processed to rewrite the marginal servo sector of the target track.

In another embodiment, the servo sectors of the near adjacent track are read to verify the servo data written over the first data sector prior to rewriting the marginal servo sector of the target track. In one embodiment, timing information provided by the servo data written over the first data sector is verified, and in another embodiment, radial head positioning information provided by the servo data written over the first data sector is verified.

In yet another embodiment, the servo data written over the first data sector comprises a plurality of servo bursts. In one embodiment, the servo data written over the first data sector comprises substantially the same information as servo data in the servo sectors of the near adjacent track, and in another embodiment, the servo sectors of the near adjacent track comprise a plurality of servo bursts, and a length of the servo bursts written over the first data sector is longer than a length of the servo bursts in the servo sectors of the near adjacent track.

In one embodiment, user data recorded in a plurality of data sectors of a plurality of near adjacent tracks is relocated to the staging memory, and servo data is written over the plurality of data sectors. The read element is used to read the servo data written over the plurality of data sectors to actuate the head and use the write element to rewrite the marginal servo sector of the target track. The user data stored in the staging memory is then rewritten to the plurality of data sectors.

In still another embodiment, the servo sectors of a plurality of tracks contiguous with the target track are rewritten. In one embodiment, the disk comprises a plurality of servo zones each comprising a plurality of tracks, and the servo sectors of the plurality of tracks of the servo zone comprising the target track are rewritten. In one embodiment, the control circuitry is further operable to rewrite the servo sectors in a radial direction inward toward a middle diameter of the disk.

Another embodiment of the present invention comprises a method of operating a disk drive, the disk drive comprising a disk having a plurality of tracks, wherein each track comprises a plurality of data sectors and a plurality of servo sectors, and a head actuated over the disk, the head comprising a read element radially offset from a write element by a reader/writer offset. In order to rewrite a marginal servo sector detected in a target track, user data recorded in a first data sector of a near adjacent track is relocated to a staging memory. Servo data is written over the first data sector, and the read element is used to read the servo data written over the first data sector to actuate the head to rewrite the marginal servo sector of the target track. The user data stored in the staging memory is then rewritten to the first data sector.

DETAILED DESCRIPTION OF EMBODIMENTS OF THE INVENTION

Figure 2A:
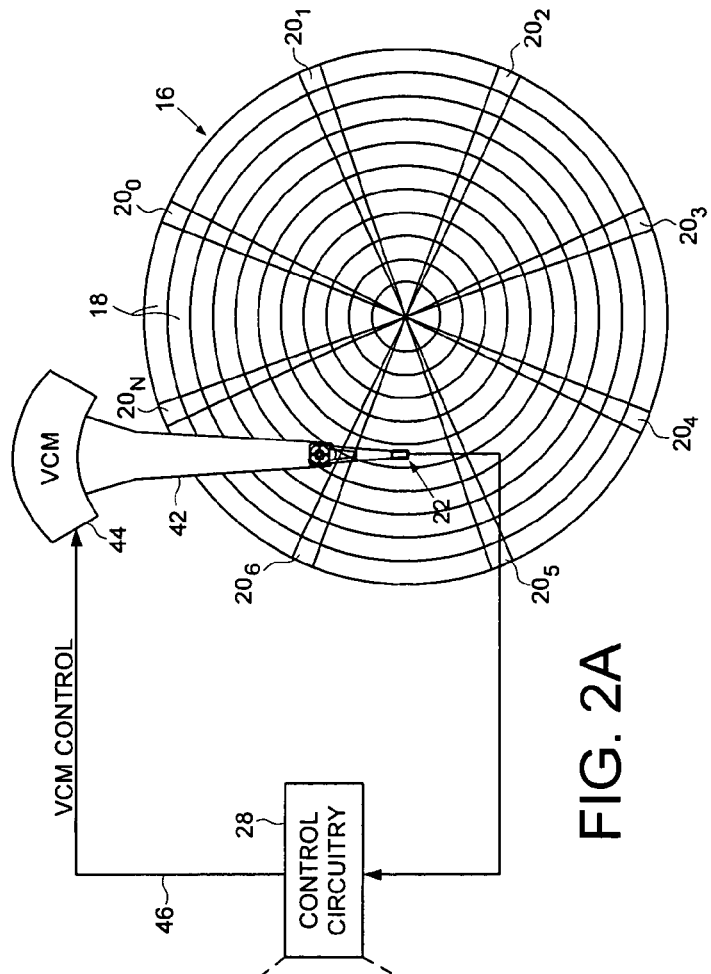
FIG. 2A shows a disk drive according to an embodiment of the present invention comprising a head actuated over a disk and control circuitry.
Figure 2B:
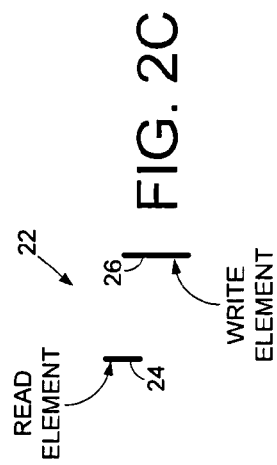
FIG. 2B is a flow diagram executed by the control circuitry for rewriting marginal servo sectors by servoing off of extended servo data written over the data sectors of a near adjacent track.
Figure 2C:
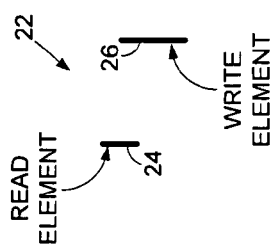
FIG. 2C shows an embodiment of the present invention wherein the head comprises a read element radially offset from a write element.

FIG. 2A shows a disk drive according to an embodiment of the present invention comprising a disk 16 having a plurality of tracks 18, wherein each track comprises a plurality of data sectors and a plurality of servo sectors $20_0$-$20_N$. The disk drive further comprises a head 22 actuated over the disk 16, the head comprising a read element 24 radially offset from a write element 26 by a reader/writer offset (FIG. 2C). The disk drive further comprises control circuitry 28 which detects and rewrites servo sectors $20_0$-$20_N$ that have become marginal, by executing the flow diagram of FIG. 2B. When a marginal servo sector is detected (step 30), user data recorded in a first data sector of a near adjacent track is relocated to a staging memory (step 32). Servo data is written over the first data sector (step 34), and the read element is used to read the servo data written over the first data sector to actuate the head (step 36) to rewrite the marginal servo sector of the target track (step 38). The user data stored in the staging memory is then rewritten to the first data sector (step 40).

In the embodiment of FIG. 2A, the head 22 is connected to a distal end of an actuator arm 42 which is rotated about a pivot by a voice coil motor (VCM) 44 in order to actuate the head 22 radially over the disk 16. In the embodiment of FIG. 2C, the read element 24 is separated from the write element 26 in-line with the actuator arm by a reader/writer gap. This means that as the actuator arm 42 rotates to position the head 22 away from the middle diameter of the disk, the resulting head skew angle will modify the reader/writer offset. Therefore, in one embodiment the read/writer offset is due to a physical offset between the center of the read element 24 and the center of the write element 26 as well as a head skew angle that varies with the radial location of the head 22.

The control circuitry 28 processes the read signal emanating from the head 22 to demodulate the information in the servo sectors $20_0$-$20_N$. The demodulated servo information (position error signal) is then processed (e.g., using appropriate compensation filtering) to generate a position control signal 46 applied to the VCM 44 in order to position the head 22 over a target data track (seek to the target data track and track the centerline of the target data track). If one or more of the servo sectors of the target servo track degrades over time or is corrupted by a bad write operation, the control circuitry 28 rewrites the servo sector according to an embodiment of the present invention.

Figure 3A:
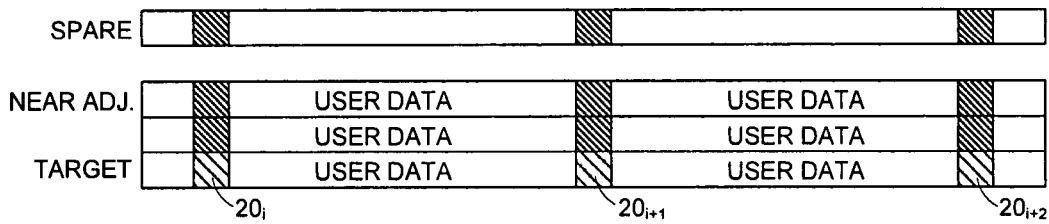
FIGS. 3A-3E illustrate an embodiment of a present invention wherein the user data of the near adjacent track is relocated to spare data sectors prior to overwriting the data sectors of the near adjacent track with the extended servo data.
Figure 3B:
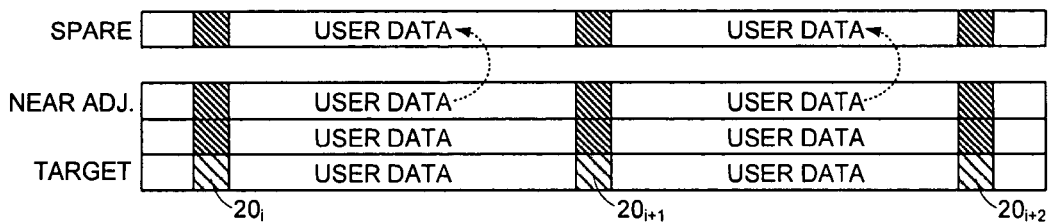
Figure 3C:
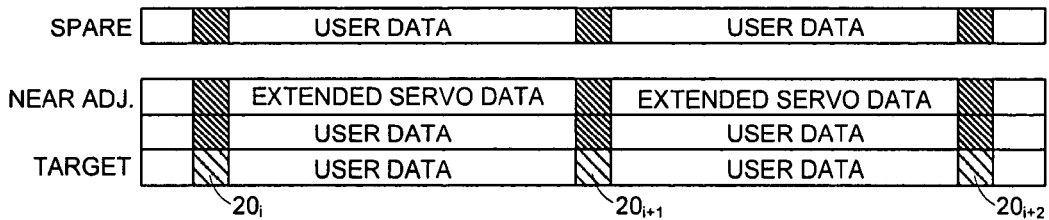
Figure 3D:
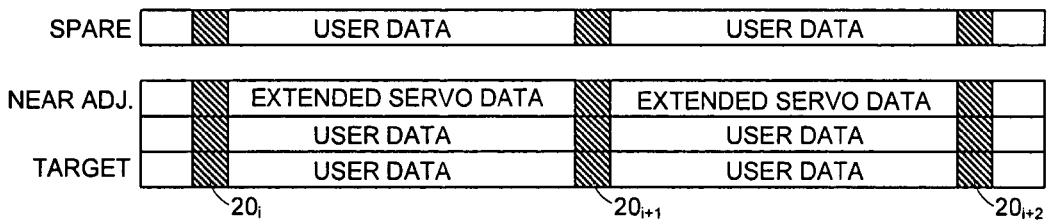
Figure 3E:
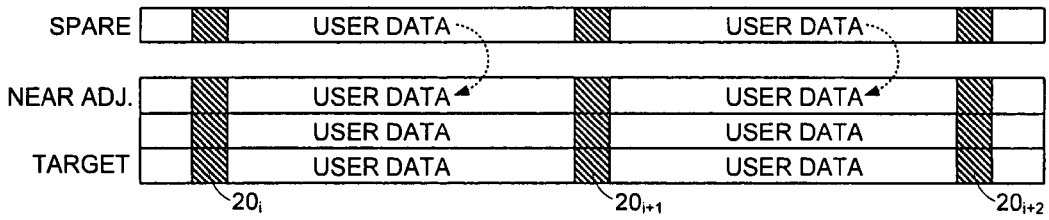

FIGS. 3A-3E illustrate how, in an embodiment of the present invention, one or more marginal servo sectors ($20_i$, $20_{i+1}$, $20_{i+2}$ etc.) of a target servo track (FIG. 3A) may be rewritten. As shown in FIG. 3B, the user data stored in the user data sectors of the near adjacent track are relocated to the spare data sectors of a spare track, and then servo data is written over the data sectors of the near adjacent track as shown in FIG. 3C. In FIG. 3D the read element reads the servo data written over the data sectors of the near adjacent track in order to actuate the head while rewriting the servo sectors of the target track. In one embodiment, the control circuitry 28 reads the servo data written over the data sectors of the near adjacent track as well as the servo data stored in the servo sectors while actuating the head to rewrite the servo sectors of the target track. After rewriting the servo sectors ($20_i$, $20_{i+1}$, $20_{i+2}$ etc.), in FIG. 3E the user data stored in the spare data sectors of the spare track is rewritten to the data sectors of the near adjacent track.

In the embodiment shown in FIGS. 3A-3E, the near adjacent track is radially offset from the target track by at least one track which corresponds to the reader/writer offset (FIG. 2C).

In an alternative embodiment, the near adjacent track is the immediate adjacent track to the target track. In one embodiment, the reader/writer offset is less than a full track, wherein the read element servos over the near adjacent track with a suitable radial offset toward the target track in order to position the write element over the target track.

Also in the embodiment shown in FIGS. 3A-3E the staging memory comprises the spare data sectors of a spare track. In an alternative embodiment, the staging memory comprises a suitable semiconductor memory, such as a non-volatile FLASH memory.

Figure 1:
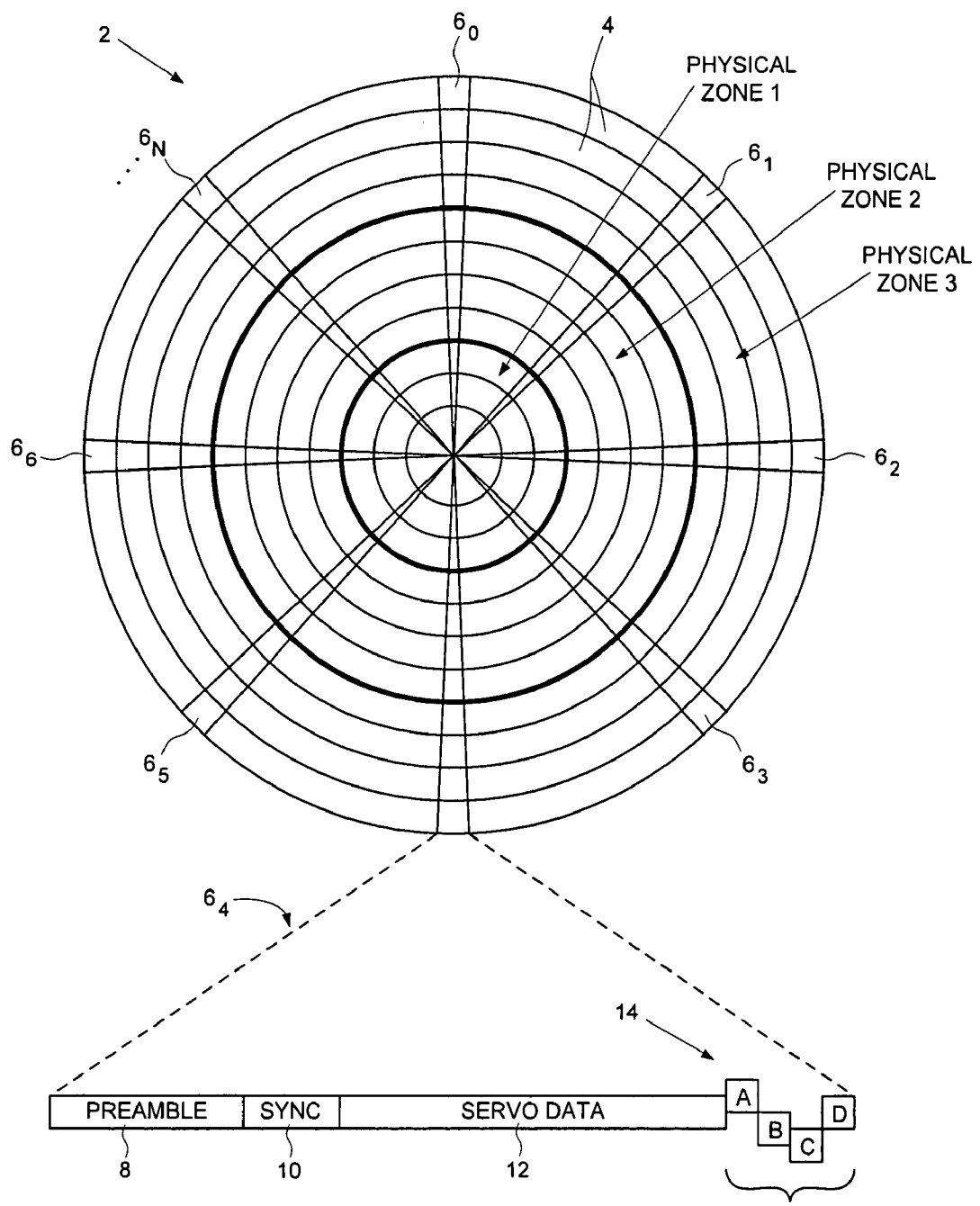
FIG. 1 shows a prior art disk format comprising a plurality of servo sectors that define a plurality of data tracks which are banded together to form a plurality of physical zones.

In yet another embodiment, the disk 16 comprises a plurality of physical zones similar to the prior art disk format shown in FIG. 1, wherein each physical zone comprises a plurality of tracks each having data sectors recorded at a user data rate and servo sectors recorded at a servo data rate. The control circuitry 28 comprises write circuitry configured to write the servo data over the data sectors of the near adjacent track at the servo data rate. In one embodiment, the control circuitry 28 further comprises read circuitry configured to read the servo data written over the data sectors of the near adjacent track at the servo data rate.

Figure 4:
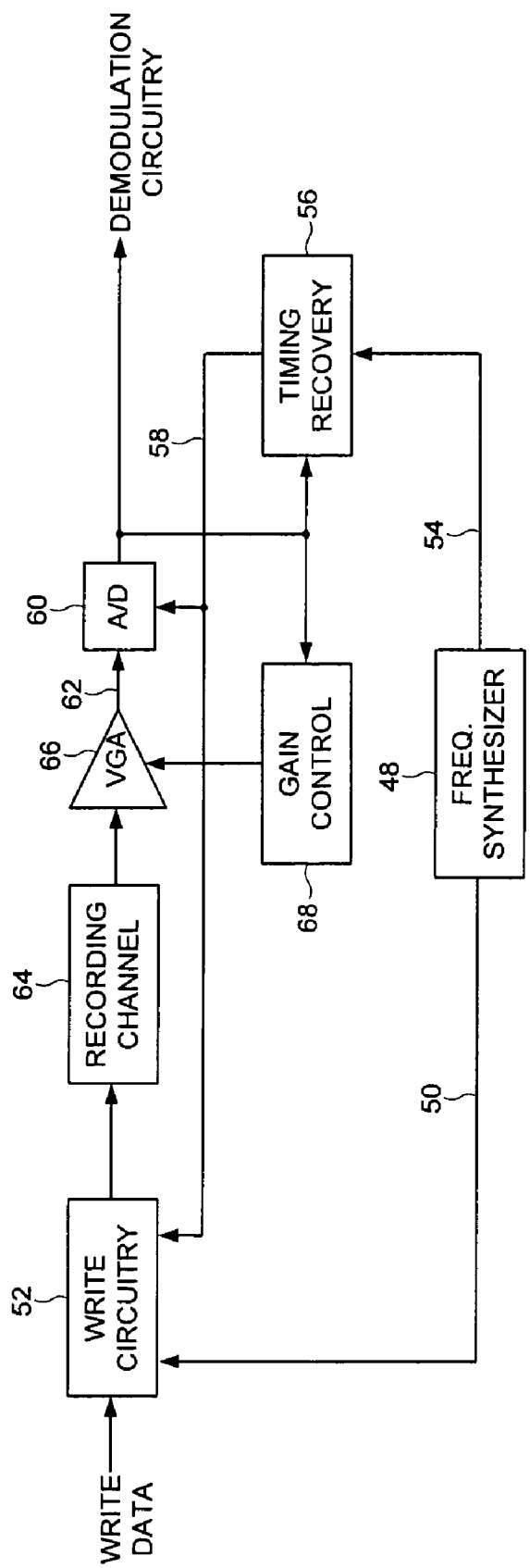
FIG. 4 shows write/read circuitry that is configured to operate at the servo data rate when writing/reading the extended servo data from the near adjacent track according to an embodiment of the present invention.

FIG. 4 shows write/read circuitry implemented by the control circuitry 28 for writing/reading user data and servo data according to an embodiment of the present invention. A frequency synthesizer 48 generates a write frequency signal 50 for clocking write circuitry 52 at the user data rate while writing user data to the disk. When reading the user/servo data from the disk, the frequency synthesizer 48 generates a read frequency signal 54 at the user/servo data rate which is applied to timing recovery circuitry 56. The timing recovery circuitry 56 generates a sampling frequency 58 applied to a sampling device (e.g., A/D 60) for sampling the read signal 62 emanating from the head 22 when reading the user/servo data from the disk. In one embodiment, the recording channel 64 is equalized into a suitable partial response (e.g., PR4, EPR4, etc.) using suitable filtering and gain control (variable gain amplifier 66 and gain control circuitry 68). With partial response signaling, the timing recovery circuitry 56 synchronizes the samples of the user/servo data, for example, by synchronizing the sampling frequency 58 applied to the sampling device 60, or through asynchronous sampling and interpolation.

In one embodiment, when writing the servo data over the data sectors of the near adjacent track, the sampling frequency 58 is synchronized to the data rate of the servo sectors $20_0$-$20_N$ of the near adjacent track. The sampling frequency 58 is then applied to the write circuitry 52 to write the servo data over the data sectors of the near adjacent track (instead of using the write frequency signal 50 output of the frequency synthesizer 48). In this manner, the servo data may be written over the data sectors at substantially the same frequency as the data rate of the servo sectors $20_0$-$20_N$. Using the synchronized sampling frequency 58 to write the servo data over the data sectors of the near adjacent track may help maintain the phase coherency in the rewritten servo sectors of the target track.

Figure 5:
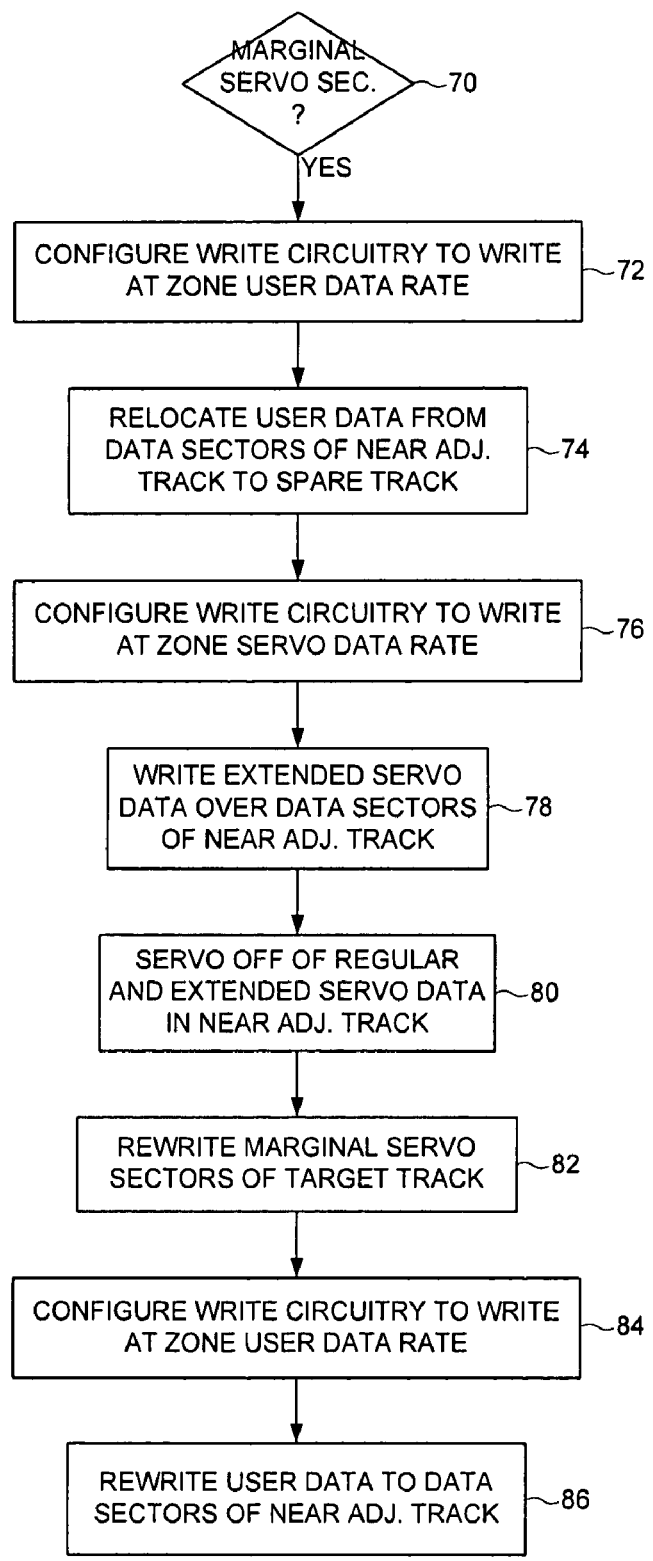
FIG. 5 is a flow diagram executed by the control circuitry for configuring the write/read circuitry into the servo data rate and user data rate according to an embodiment of the present invention.

In order to write servo data over the data sectors of the near adjacent track the control circuitry 28 comprises suitable modifications to allow the write/read circuitry to operate at the servo data rate while the head 22 is positioned over the data sectors. This embodiment is illustrated in the flow diagram of FIG. 5 executed by the control circuitry 28 wherein when a marginal data sector is detected (step 70), the write circuitry of FIG. 4 is configured to write at the user data rate of the physical zone comprising the spare track (step 72). The user data stored in the data sectors of the near adjacent track is then relocated to the spare data sectors of the spare track (step 74). The control circuitry 28 configures the read circuitry of FIG. 4 to read the servo sectors $20_0$-$20_N$ of the near adjacent track in order to synchronize the sampling frequency 58 to the servo data rate of the servo zone, and then applies the sampling frequency 58 to the write circuitry 52 (step 76) in order to write servo data over the data sectors of the near adjacent track at the servo zone data rate (step 78). In one embodiment, the servo data rate is constant across the disk surface (one physical servo zone), and in an alternative embodiment, the servo data rate varies across the disk surface (multiple physical servo zones). The control circuitry 28 then configures the read circuitry of FIG. 4 to read at the servo data rate, and reads the servo sectors $20_0$-$20_N$ stored in the near adjacent track as well as the servo data written over the data sectors of the near adjacent track in order to actuate the head 22 (step 80) while rewriting the servo sectors of the target track (step 82). The control circuitry 28 then configures the write circuitry of FIG. 4 to write at the user data rate of the physical zone comprising the near adjacent track (step 84) and rewrites the user data stored in the spare track to the data sectors of the near adjacent track (step 86).

In one embodiment, the servo data written over the data sectors of the near adjacent track is verified prior to rewriting the marginal servo sectors of the target track. Any suitable aspect of the servo data may be verified, wherein in one embodiment, timing information provided by the servo data written over the data sectors of the near adjacent track is verified. For example, in one embodiment the servo data written over the data sectors comprises a preamble for synchronizing the timing recovery circuitry 56, wherein a zero-phase restart value is generated when first sampling the preamble. The timing recovery circuitry 56 is initially synchronized to the servo data of a servo sector $20_i$, and then synchronized to the preamble of the servo data written over the data sectors. If the servo data written over the data sectors is written correctly (zero timing error), then the zero-phase restart value will be zero. Similarly, after reading the servo data written over the data sectors, when reading the preamble in the following servo sector $20_{i+1}$, the zero-phase restart value will be zero if the servo data was written correctly. If the zero-phase restart value exceeds a threshold, the servo data written over the data sectors is considered invalid and rewritten until the zero-phase restart value falls below the threshold. In another embodiment, radial head positioning information provided by the servo data written over the data sectors of the near adjacent track is verified. Similar to the timing information, if the position error signal generated from reading the servo data exceeds a threshold, the servo data may be rewritten until the position error signal falls below the threshold.

Figure 6:
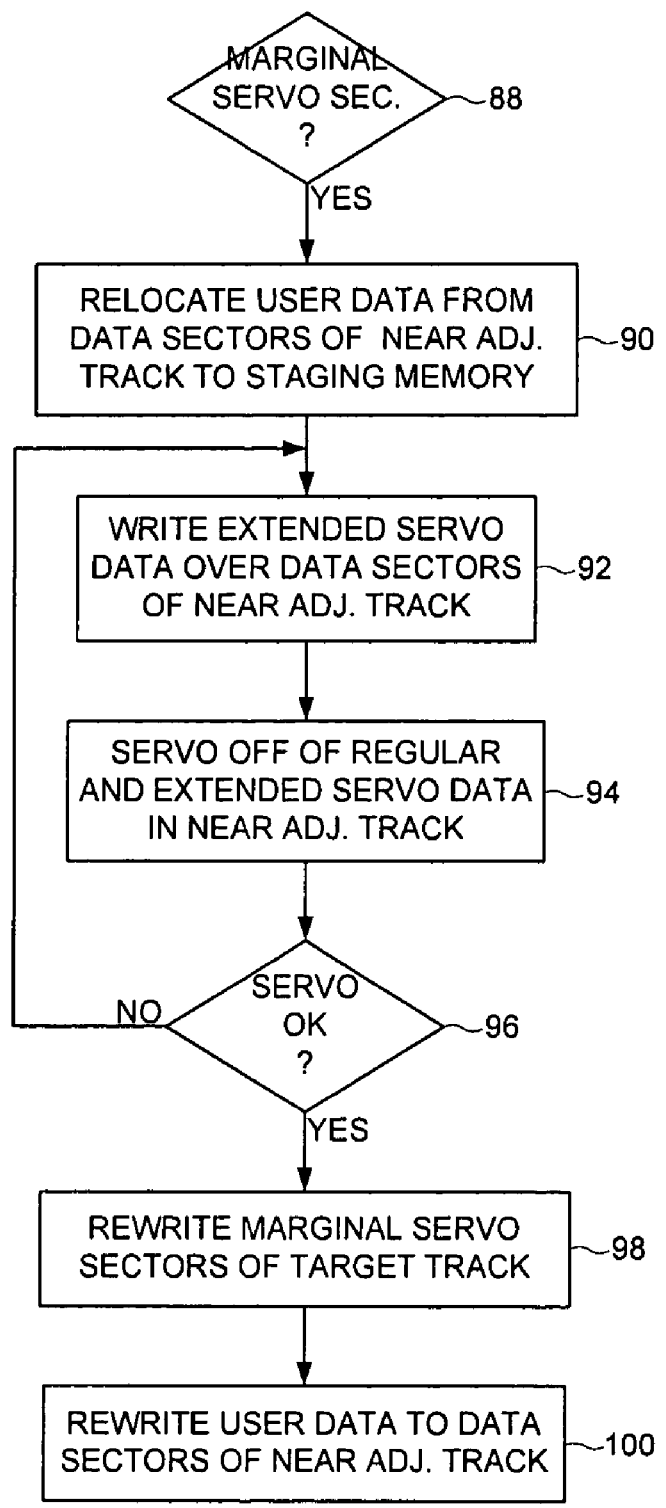
FIG. 6 is a flow diagram according to an embodiment of the present invention wherein the extended servo data written in the near adjacent track is verified using the existing servo sectors written in the near adjacent track.

FIG. 6 is a flow diagram executed by the control circuitry 28 for verifying the servo data, wherein when a marginal data sector is detected (step 88), the user data stored in the data sectors of the near adjacent track is relocated to the staging memory (step 90). The servo data is then written over the data sectors of the near adjacent track (step 92) and used, together with the servo sectors $20_0$-$20_N$, to servo the head and verify the validity of the servo data (step 94). If the servo data is not valid (step 96), then the servo data is rewritten. Otherwise the servo data is used to servo the head while rewriting the servo sectors of the target track (step 98) and then the user data is rewritten from the staging memory to the data sectors of the near adjacent track (step 100). In one embodiment, if a subset of the servo data is found invalid (step 96) after a number of attempts at rewriting (e.g., due to a media defect), the subset of invalid servo data is "mapped out" so that it is not used to rewrite the servo sectors of the target track.

Figure 7A:
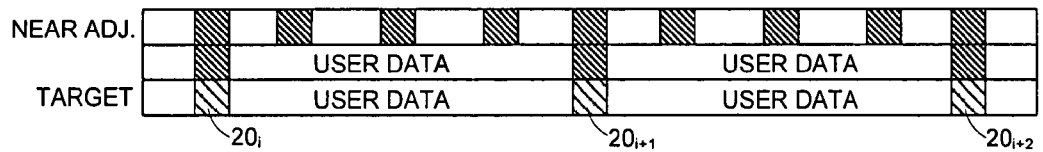
FIG. 7A shows an embodiment of the present invention wherein the extended servo data comprises the same format as the servo sectors.
Figure 7B:
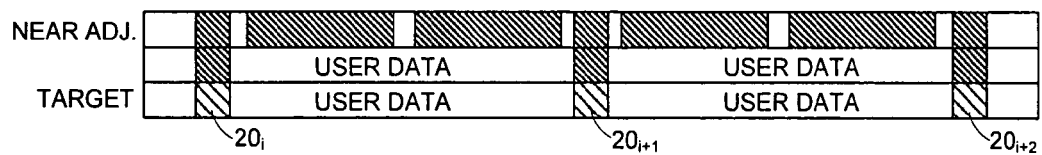
FIG. 7B shows an embodiment of the present invention wherein the extended servo data comprises extended servo bursts.

In one embodiment, the servo data written over the data sectors of the near adjacent track comprises a plurality of servo bursts, and in one embodiment, the servo data written over the data sectors comprises substantially the same information as the servo data in the servo sectors $20_0$-$20_N$ of the near adjacent track, including the same number and length of servo bursts. This embodiment is illustrated in FIG. 7A wherein the servo sectors $20_0$-$20_N$ of the near adjacent track are duplicated a number of times in the servo data written over the data sectors. In another embodiment illustrated in FIG. 7B, the number and/or length of the servo bursts written over the data sectors of the near adjacent track is greater than the number and/or length of the servo bursts in the servo sectors $20_0$-$20_N$ of the near adjacent track. Increasing the number and/or length of the servo bursts may improve the signal-to-noise ratio when generating the timing and position information.

Figure 7C:
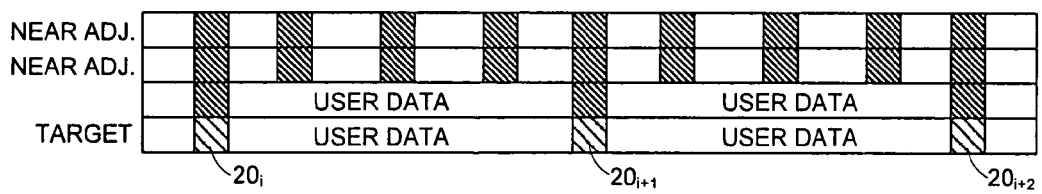
FIG. 7C shows an embodiment of the present invention wherein extended servo data is written over multiple near adjacent tracks.

FIG. 7C shows an embodiment of the present invention wherein the user data recorded in a plurality of data sectors of a plurality of near adjacent tracks is relocated to the staging memory, and servo data is written over the plurality of data sectors. The read element is used to read the servo data written over the plurality of data sectors to actuate the head and use the write element to rewrite the marginal servo sector of the target track. The user data stored in the staging memory is then rewritten to the plurality of data sectors. This embodiment may improve performance since the head may span two servo tracks while servoing off of the servo sectors $20_0$-$20_N$, for example, due to the reader/writer offset including a fraction of a track, as well as the different target radial locations when writing the servo bursts to the servo sectors $20_0$-$20_N$ of the target track.

Figure 8:
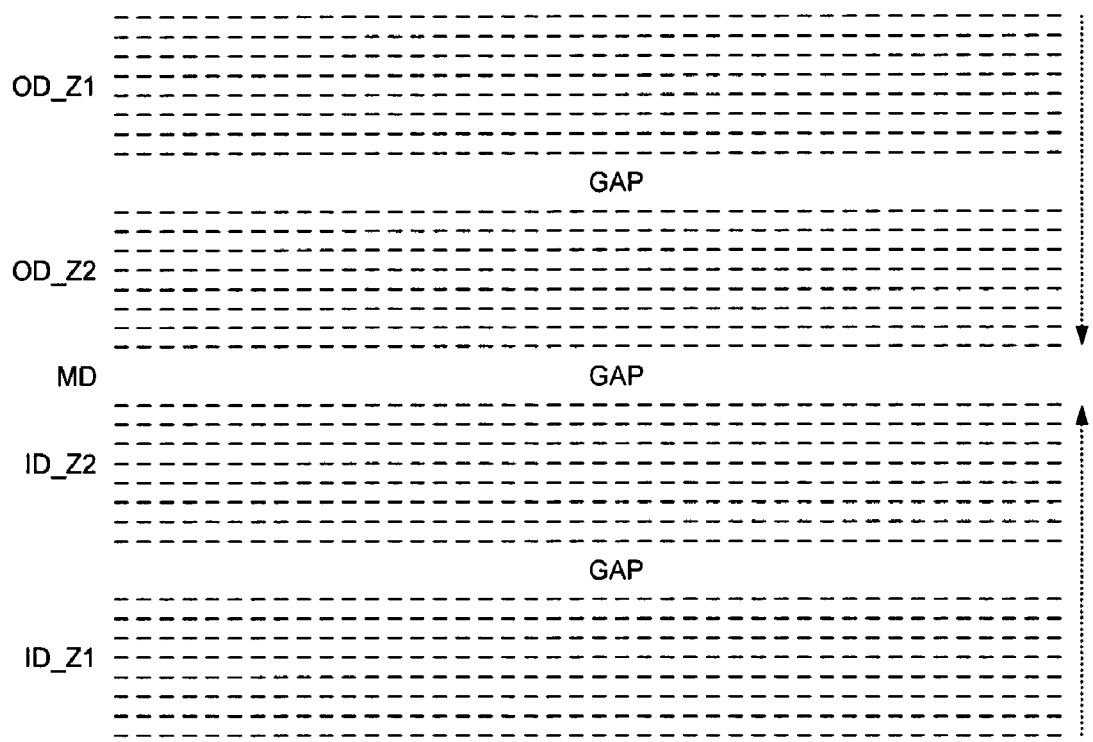
FIG. 8 shows an embodiment of the present invention wherein the servo sectors are rewritten in servo zones separated by gaps to help maintain continuity and phase coherency across the servo sectors in the radial direction.

In still another embodiment, the servo sectors of a plurality of tracks contiguous with the target track are rewritten. In one embodiment, the disk comprises a plurality of servo zones each comprising a plurality of tracks, and the servo sectors $20_0$-$20_N$ of the plurality of tracks of the servo zone comprising the target track are rewritten. This embodiment is illustrated in FIG. 8 which shows the tracks banded together forming four servo zones, wherein the servo zones may be the same or different than physical zones. When the servo sectors $20_0$-$20_N$ of a track need to be rewritten, the servo sectors $20_0$-$20_N$ of all the tracks within the servo zone are rewritten. This may help maintain continuity and phase coherency of the servo sectors $20_0$-$20_N$ radially across the tracks compared to rewriting the servo sectors $20_0$-$20_N$ of a single track. In addition, it is more efficient to rewrite only a subset of the tracks (a servo zone) compared to rewriting all of the tracks over the entire disk surface.

In one embodiment, the servo sectors $20_0$-$20_N$ are initially written from an inner diameter of the disk to a middle diameter, and from an outer diameter of the disk to the middle diameter to avoid the overwrite effect of the write element. Thus, in one embodiment the disk comprises two servo zones (inner diameter or ID and outer diameter or OD) with a gap near the middle diameter (MD), wherein the servo sectors $20_0$-$20_N$ of the entire zone are rewritten when any one track needs rewriting. In another embodiment, the two large servo zones are subdivided into smaller servo subzones with gaps there between, such as the two servo subzones for each of the ID and OD as illustrated in FIG. 8. When rewriting the servo sectors $20_0$-$20_N$ of one of the servo subzones, the servo sectors $20_0$-$20_N$ may be written toward the middle diameter of the disk (as illustrated by the arrows in FIG. 8) similar to how the servo sectors $20_0$-$20_N$ were written initially (to avoid the overwrite effect of the write element).

In one embodiment, the servo zones and/or subzones (as well as the gaps) are statically defined for each disk surface. In an alternative embodiment, the servo zones and/or subzones (as well as the gaps) are dynamically defined during the lifetime of the disk drive. For example, in one embodiment a servo zone and/or subzone is defined after detecting a number of localized tracks comprising marginal servo sectors exceeds a threshold. The corresponding tracks are grouped together to define a servo zone or subzone and then rewritten together. In one embodiment, the last track of a dynamic servo zone or subzone is rendered unusable due to the rewrite operation (i.e., the last track becomes the gap shown in FIG. 8). Therefore, prior to rewriting the servo sectors of a servo zone or subzone, the data sectors of the last track are relocated to spare data sectors, and the last track identified as defective so that it is not reused to store user data.

Any suitable control circuitry 28 may be employed in the embodiments of the present invention, such as any suitable integrated circuit or circuits. For example, the control circuitry 28 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 28 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 28 comprises suitable logic circuitry, such as state machine circuitry.

What is claimed is:

1. A disk drive comprising:
    a disk comprising a plurality of tracks, wherein each track comprises a plurality of data sectors and a plurality of servo sectors;
    a head actuated over the disk, the head comprising a read element radially offset from a write element by a reader/writer offset; and
    control circuitry configured to:
        detect a marginal servo sector in a target track;
        relocate user data recorded in a first data sector of a near adjacent track to a staging memory;
        write servo data over the first data sector;
        use the read element to read the servo data written over the first data sector to actuate the head to rewrite the marginal servo sector of the target track; and
        rewrite the user data stored in the staging memory to the first data sector.

2. The disk drive as recited in claim 1, wherein the staging memory comprises a spare data sector on the disk.

3. The disk drive as recited in claim 1, wherein the staging memory comprises a semiconductor memory.

4. The disk drive as recited in claim 1, wherein the near adjacent track is radially offset from the target track by at least one track; and the radial offset is based on the reader/writer offset.

5. The disk drive as recited in claim 1, wherein:

the disk comprises a plurality of physical zones, wherein each physical zone comprises a plurality of tracks each having data sectors recorded at a user data rate and servo sectors recorded at a servo data rate; and the control circuitry configures write circuitry to write the servo data over the first data sector at the servo data rate.

6. The disk drive as recited in claim 5, wherein the control circuitry configures read circuitry to read the servo data written over the first data sector at the servo data rate.

7. The disk drive as recited in claim 1, wherein the control circuitry is further configured to read servo data in the servo sectors of the near adjacent track to rewrite the marginal servo sector of the target track.

8. The disk drive as recited in claim 1, wherein the control circuitry is further configured to read servo data in the servo sectors of the near adjacent track to verify the servo data written over the first data sector prior to rewriting the marginal servo sector of the target track.

9. The disk drive as recited in claim 8, wherein the control circuitry verifies timing information provided by the servo data written over the first data sector.

10. The disk drive as recited in claim 8, wherein the control circuitry verifies radial head positioning information provided by the servo data written over the first data sector.

11. The disk drive as recited in claim 1, wherein the servo data written over the first data sector comprises a plurality of servo bursts.

12. The disk drive as recited in claim 11, wherein the servo data written over the first data sector comprises substantially the same information as servo data in the servo sectors of the near adjacent track.

13. The disk drive as recited in claim 11, wherein:

the servo sectors of the near adjacent track comprise a plurality of servo bursts; and a length of the servo bursts written over the first data sector is longer than a length of the servo bursts in the servo sectors of the near adjacent track.

14. The disk drive as recited in claim 1, wherein the control circuitry is further configured to:

relocate user data recorded in a plurality of data sectors of a plurality of near adjacent tracks to the staging memory;

write servo data over the plurality of data sectors;

use the read element to read the servo data written over the plurality of data sectors to actuate the head and use the write element to rewrite the marginal servo sector of the target track; and rewrite the user data stored in the staging memory to the plurality of data sectors.

15. The disk drive as recited in claim 1, wherein the control circuitry is further configured to rewrite the servo sectors of a plurality of tracks contiguous with the target track.

16. The disk drive as recited in claim 15, wherein:

the disk comprises a plurality of servo zones each comprising a plurality of tracks; and the control circuitry is further operable to rewrite the servo sectors of the plurality of tracks of the servo zone comprising the target track.

17. The disk drive as recited in claim 15, wherein the control circuitry is further configured to rewrite the servo sectors in the same radial direction that the servo sectors were written initially.

18. The disk drive as recited in claim 17, wherein the control circuitry is further configured to rewrite the servo sectors in a radial direction toward a middle diameter of the disk.

19. A method of operating a disk drive, the disk drive comprising a disk having a plurality of tracks, wherein each track comprises a plurality of data sectors and a plurality of servo sectors, and a head actuated over the disk, the head comprising a read element radially offset from a write element by a reader/writer offset, the method comprising:

detecting a marginal servo sector in a target track;

relocating user data recorded in a first data sector of a near adjacent track to a staging memory;

writing servo data over the first data sector;

using the read element to read the servo data written over the first data sector to move the head to rewrite the marginal servo sector of the target track; and rewriting the user data stored in the staging memory to the first data sector.

20. The method as recited in claim 19, wherein the staging memory comprises a spare data sector on the disk.

21. The method as recited in claim 19, wherein the staging memory comprises a semiconductor memory.

22. The method as recited in claim 19, wherein the near adjacent track is radially offset from the target track by at least one track; and the radial offset is based on the reader/writer offset.

23. The method as recited in claim 19, wherein:

the disk comprises a plurality of physical zones, wherein each physical zone comprises a plurality of tracks each having data sectors recorded at a user data rate and servo sectors recorded at a servo data rate; and the method further comprises configuring write circuitry to write the servo data over the first data sector at the servo data rate.

24. The method as recited in claim 23, further comprising configuring read circuitry to read the servo data written over the first data sector at the servo data rate.

25. The method as recited in claim 19, further comprising reading the servo data in the servo sectors of the near adjacent track to rewrite the marginal servo sector of the target track.

26. The method as recited in claim 19, further comprising reading the servo data in the servo sectors of the near adjacent track to verify the servo data written over the first data sector prior to rewriting the marginal servo sector of the target track.

27. The method as recited in claim 26, further comprising verifying timing information provided by the servo data written over the first data sector.

28. The method as recited in claim 26, further comprising verifying radial head positioning information provided by the servo data written over the first data sector.

29. The method as recited in claim 19, wherein the servo data written over the first data sector comprises a plurality of servo bursts.

30. The method as recited in claim 29, wherein the servo data written over the first data sector comprises substantially the same information as servo data in the servo sectors of the near adjacent track.

31. The method as recited in claim 29, wherein:

the servo sectors of the near adjacent track comprise a plurality of servo bursts; and a length of the servo bursts written over the first data sector is longer than a length of the servo bursts in the servo sectors of the near adjacent track.

32. The method as recited in claim 19, further comprising:
- relocating user data recorded in a plurality of data sectors of a plurality of near adjacent tracks to the staging memory;
- writing servo data over the plurality of data sectors;
- using the read element to read the servo data written over the plurality of data sectors to actuate the head and use the write element to rewrite the marginal servo sector of the target track; and
- rewriting the user data stored in the staging memory to the plurality of data sectors.

33. The method as recited in claim 19, further comprising rewriting the servo sectors of a plurality of tracks contiguous with the target track.

34. The method as recited in claim 33, wherein:
- the disk comprises a plurality of servo zones each comprising a plurality of tracks; and
- the method further comprises rewriting the servo sectors of the plurality of tracks of the servo zone comprising the target track.

35. The method as recited in claim 33, further comprising rewriting the servo sectors in the same radially direction as the servo sectors were written initially.

36. The method as recited in claim 35, further comprising rewriting the servo sectors in a radial direction toward a middle diameter of the disk.

37. A disk drive comprising:
- a disk comprising a plurality of tracks, wherein each track comprises a plurality of data sectors and a plurality of servo sectors;
- a head actuated over the disk, the head comprising a read element radially offset from a write element by a reader/writer offset;
- a means for detecting a marginal servo sector in a target track;
- a means for relocating user data recorded in a first data sector of a near adjacent track to a staging memory;
- a means for writing servo data over the first data sector;
- a means for using the read element to read the servo data written over the first data sector to actuate the head to rewrite the marginal servo sector of the target track; and
- a means for rewriting the user data stored in the staging memory to the first data sector.

* * * * *